Nov. 3, 1964     H. NICOLAY ETAL     3,155,435
BRAKE PRESSURE GOVERNOR FOR PNEUMATIC BRAKES
Filed July 30, 1962
Fig. 1
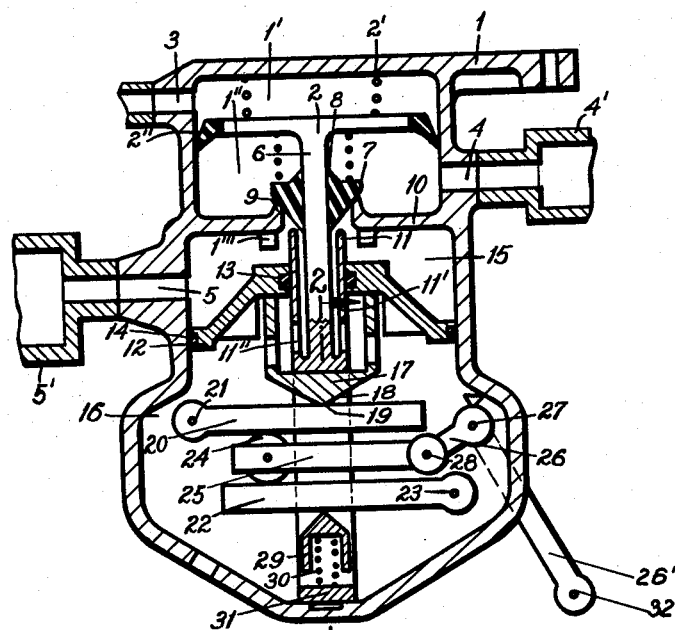
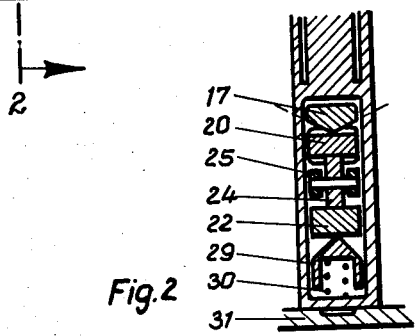
Fig. 2
Inventors
Heinz Nicolay
Hans Grüner
By Ernest Montague
Attorney

United States Patent Office 3,155,435
Patented Nov. 3, 1964

3,155,435
BRAKE PRESSURE GOVERNOR FOR
PNEUMATIC BRAKES
Heinz Nicolay, Heidelberg, and Hans Gruener, Heidelberg-Wieblingen, Germany, assignors to Graubremse G.m.b.H., Heidelberg, Germany, a corporation of Germany
Filed July 30, 1962, Ser. No. 213,334
3 Claims. (Cl. 303—40)

The present invention relates to a brake pressure governor controlled relative to the axle load and having a brake piston and a control piston, between which a linkage is arranged which is variable by the deflection of the vehicle suspension.

Load-dependent control valves are known, employing two rocking beams between which an adjusting member is operable, to provide for different transmission ratios, so that by means of pressure pistons a balancing action is obtained which enables an adaptation of the brake force to the actual load condition of the vehicle. These lever arrangements, however, have the disadvantage that when the transmission ratios change and during the balancing action in connection with the pressure piston, the parallel arrangement of the rocking beams is not maintained. The adjustment of the rocking beams relative to each other and the pivoting movement about the points of contact of the adjusting members resulting therefrom, cause inaccurate operation and great friction in the linkage so that the requirements with respect to accurate pressure adaptation are not met.

It is one object of the present invention to provide a brake pressure governor, which eliminates these deficiencies in that the shaft of the control piston forms a vent seat and that a double-valve body is arranged between the control piston and the vent seat and guided on the control piston shaft to cooperate and according to the control piston position with the housing seat between the air reservoir connection and the brake line connection on the one hand and with the vent seat on the other hand.

It is another object of the present invention to provide a brake pressure governor, wherein the shaft of the control piston extends beyond the vent seat to form a fork between which the transfer linkage is guided which is controlled by the vehicle suspension. To ensure safe contact of the fork with the plug, the fork is provided, below the transfer linkage and between its arms, with an elastic support for the linkage levers.

It is yet another object of the present invention to provide a brake pressure governor, wherein the brake piston forms a trailing piston which is sealingly guided on that part of the control piston shaft which forms the vent seat. The brake piston is displaceable on the control piston shaft and cooperates with a plug which extends through the fork to bear against the transfer linkage and to rest on the underside of the brake piston.

It is a further object of the present invention to provide a brake pressure governor, wherein the piston forms an overflow piston accommodated in a housing having a connection each above and below the piston which can be connected selectively so that in single-line systems the chamber above the control piston is in communication with the control line and the chamber below the piston with the line leading to the air reservoir, while in two-line systems the connection above the piston is in communication with the atmosphere and the connection below the piston with the control line.

With these and other objects in view, which will become apparent in the following detailed description, the present invention will be clearly understood in connection with the accompanying drawing, in which:

FIG. 1 is a longitudinal sectional view through a brake pressure governor in accordance with the present invention; and FIG. 2 is a sectional view along the lines 2—2 of FIG. 1.

Referring now to the drawing, the main housing 1 accommodates a combined control and brake piston 2, separating the main housing 1 into the chambers 1' and 1". In the chamber 1', a spring 2' is associated with the piston 2. The connection of the feed or control line is indicated at 3. In two-line brake systems, the connection 4 for the air reservoir 4' receives the pressure impulses coming from an auxiliary device (not shown).

The connection 5 to the brake cylinders 5' in single- or two-line brake systems is indicated.

The piston 2 has a piston rod 6 provided with a three-stage sealing cone 7 to seal the piston rod at 8, as well as the valve seat 9, the separating wall 10 and an outlet seat 11 which is connected with the piston rod 2.

The extended outlet seat 11' passes through a free piston 12 having seals 13 and 14. The piston 12 separates the brake chamber 15 from the chamber 16 which is under normal atmospheric pressure, and bears against a plug 17 which in turn is guided in the fork-like end 18 for the piston rod 6.

The plug tip 19 rests on the balance lever 20 which is journalled at 21. The balance lever 22 is inversed 180 degrees with respect to the balance lever 20 and journalled at 23. Between the balance levers 20 and 22 the glide roller 24 is arranged which cooperates with a lever 25 which is driven through a bell crank mechanism 26, 26', pivoted about the pivotal point 27 of the bell crank lever 26. The pivotal point 28 joins the bell crank lever 26 with the lever 25. A plug 29 is subjected to the action of a spring 30. An end plug 31 of the fork-like end 18 forms a unit together with the piston rod 2 and the valve seats 11 and 11'. The end 32 of the bell crank lever 26, 26' is connected to a device (not shown) which transmits the load condition of the vehicle.

Operation of the device in single-line brake systems or indirect systems in prime movers and/or trailers is performed as follows:

In the released position compressed air flows through the feed line connection 3 into the chamber 1'. The compressed air passes over the packing ring 2" and, through the air reservoir connection 4 to the air reservoir 4'. The three-stage sealing cone 7 has closed the valve seat 9 and the outlet or vent seat 11 is opened so that the brake cylinders 5' communicating with the connection 5 are de-aerated through the bores 11" of the valve seat extension 11'. According to the load, the end 32 has caused a displacement of the roller 24 between the balance levers 20 and 22. The valve is now ready for operation.

When actuating the brake, the pressure in the chamber 1' is reduced, and the piston 2 is biased on the side of the chamber 1". The piston 2 acts as soon as the force of the spring 2' has been overcome. During this upward movement of the piston 2 the piston rod 6 passes through the three-stage sealing cone 7. The vent seat 11 is closed and the cone 7 lifted off its seat 9. Compressed air flows from the chamber 1" to the brake chamber 15 and fills the brake cylinders in communication with the connection 5.

The pressure in the chamber 15 acts on the piston 12. The arrangement of the piston 12 causes the latter to act in downward direction and to balance the effective forces on the piston sides in the chambers 1' and 1". The three-stage sealing cone 7 closes the seat 9. Upon further pressure variations the above described operation is repeated until the chamber 1' is without pressure. In the chamber 15, a brake pressure is then built up which depends on the position of the roller 24. With a reservoir air pressure which is equal to the pressure in the chamber 1", and a position of the roller as indicated, a pressure of 1.5 kg./cm.² is built up in the chamber 15 when the chamber 1' is emptied. When the roller 24 is transferred into its outer right hand position, the same pressure builds up in the chamber 15 as exists in the chamber 1".

When braking, it is of importance that the piston 12 remains in its lowermost position during the upward movement of the piston 2 or that it moves only for a short distance up to an abutment 1'''. The vent seat 11 with its extension 11' causes the seat to be closed and the cone 7 to be lifted off the seat 9. A plug member 29, a spring 30 and the end plug 31 have maintained the contact of the balance levers 22, 20 and the roller 24 with the plug 17. When balancing the pistons 2 and 12, i.e. when the seats 9 and 11 are closed, the balance levers 20 and 22 are positioned parallel to each other and vertically relative to the valve axis.

In this manner it is possible to have variations made at the end 32 during the braking operation with comparatively little effort. This is particularly necessary when the dynamic axle load transfer necessitates variations of the brake cylinder pressures.

Since the levers remain parallel, undesired variations of the brake pressure during a braking operation are avoided. Such variations are possible, when the balance levers 20 and 22 can pivot about the points of contact of the roller 24.

If, during release of the brake, the pressure is increased in the chamber 1' by means of the connection 3, the piston 12 is biased. Its force is transferred by means of the plug 17 to the balancing lever 20, the roller 24, the balancing lever 22 and the elastic members 29, 30, and 31. The seat 9 is closed, while the seat 11 is opened. The pressure in the chamber 15 is reduced until the forces in the chambers 1', 1" and 15 are equalized.

As soon as the pressure in the chambers 1' and 1" is equalized, the piston 2 receives its absolute overweight by means of the auxiliary spring 2'. The chamber 15 is emptied through the bores 11. The brakes are released.

In two-line brake systems of prime movers and trailers, the connection 3 is in communication with the atmosphere. The connection 4 is in communication with an impulse transmitter or auxiliary valve, and the connection 5 is still connected with the brake cylinders. When pressure builds up in the chamber 1", the piston 2 is moved upwards after being able to respond, whereby the valve cone 7 is lifted off the seat 9 after the vent seat 11 has been closed by the valve cone 7. In the chamber 15 a certain pressure now builds up in accordance with the position of the roller 24, depending upon the load condition.

While we have disclosed on embodiment of the present invention, it is to be understood that this embodiment is given by example only and not in a limiting sense, the scope of the present invention being determined by the objects and the claims.

We claim:
1. In a fluid pressure brake apparatus for use with a vehicle,
   a housing,
   a dividing wall extending across said housing and having a center opening formed as a valve seat,
   said dividing wall separating said housing into a control chamber and a brake chamber,
   a spring biased control piston reciprocating in said control chamber and having a piston rod extending through said valve seat,
   a brake piston reciprocating in said brake chamber,
   lever means operable in response to the load of the vehicle disposed in said housing and engaging said brake piston and said piston rod of said control piston, respectively,
   said lever means constituting a connection between said control piston and said brake piston,
   a control conduit for feeding pressurized fluid into said control chamber to said control piston,
   said brake chamber having an opening adapted to communicate with brake cylinders of said vehicle,
   a sealing cone mounted on said piston rod and engaging said valve seat in one of the operating positions of said control piston,
   resilient means for engagement of said lever means on said piston rod,
   the free end of said piston rod of said control piston being forked,
   said lever means extending through said forked end, and
   said resilient means comprising a plug and a spring within said forked end urging said plug toward said lever means.
2. The apparatus, as set forth in claim 1, which includes
   a second plug extending across said forked end of said piston rod opposite said first mentioned plug,
   said second plug engages at one end said brake piston and at the other end said lever means.
3. The apparatus, as set forth in claim 2, wherein
   said first plug and said second plug have at the side engaging said lever means a sharp edge formation, and
   said edge formations are disposed substantially in the longitudinal axis of said piston rod.

References Cited in the file of this patent
UNITED STATES PATENTS

| | | |
|---|---|---|
| 2,940,796 | Ortmann et al. | June 14, 1960 |
| 3,068,050 | Pekrul | Dec. 11, 1962 |

FOREIGN PATENTS

| | | |
|---|---|---|
| 567,343 | Belgium | May 31, 1958 |
| 1,086,796 | France | Aug. 11, 1954 |